No. 655,564. Patented Aug. 7, 1900.
J. H. LYDAY.
PORTABLE EGG CASE.
(Application filed July 13, 1899.)
(No Model.)
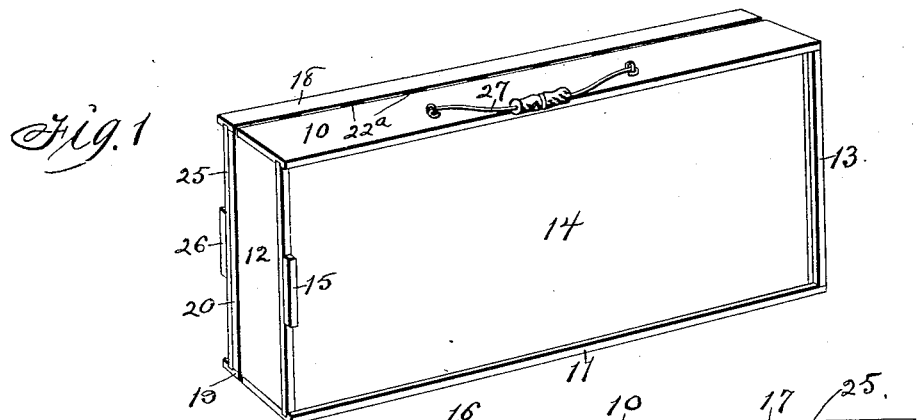
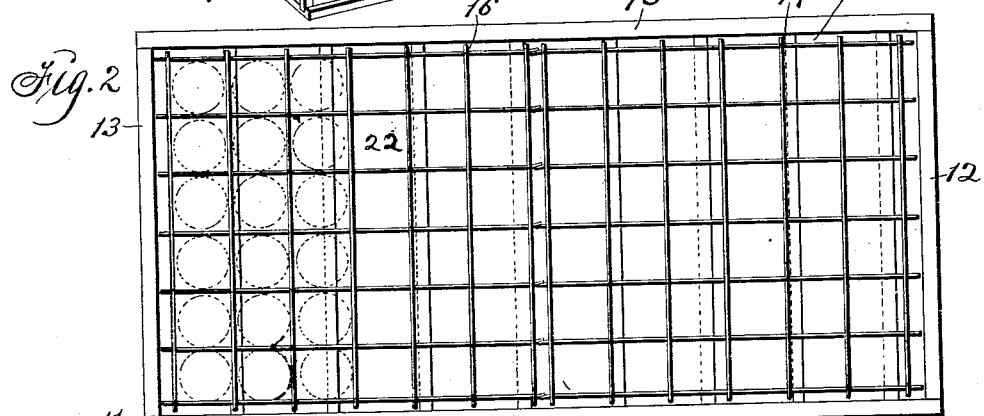
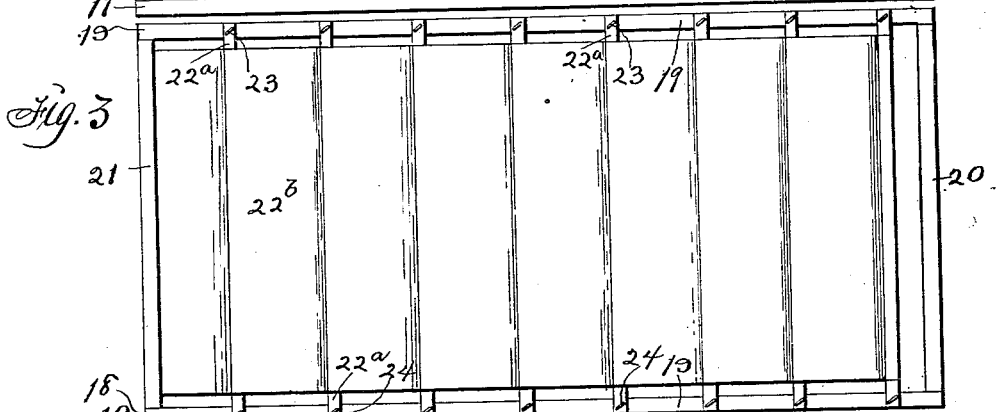
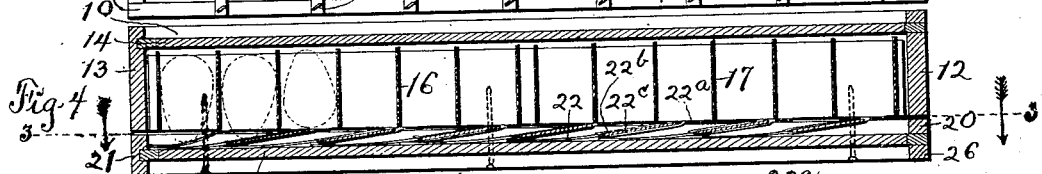
Witnesses:
R. G. Orwig.
F. C. Stuart.
Inventor: Joseph H. Lyday,
By Thomas G. Orwig, Attorney

UNITED STATES PATENT OFFICE.

JOSEPH H. LYDAY, OF NEWTON, IOWA.

PORTABLE EGG-CASE.

SPECIFICATION forming part of Letters Patent No. 655,564, dated August 7, 1900.

Application filed July 13, 1899. Serial No. 723,659. (No model.)

*To all whom it may concern:*

Be it known that I, JOSEPH H. LYDAY, a citizen of the United States, residing at Newton, in the county of Jasper and State of Iowa, have invented a new and useful Portable Egg-Case, of which the following is a specification.

One object is to provide an egg-case specially adapted for storing and carrying and marketing eggs and in which eggs can be readily placed when the bottom is closed and the top is open in such a manner that each egg will be in a separate compartment that has a flexible bottom adapted to serve as a cushion to protect the egg from concussion.

A further object is to facilitate the removal of the eggs without lifting them through the top of the case by simply removing the bottom of the case and then lifting the case to allow the free ends of the flexible bottoms to descend and to gently deposit the eggs upon a counter in a store, a table, or other suitable support in such a manner that they can be readily inspected and counted by the merchant or purchaser who receives them.

My invention consists in the construction, arrangement, and combination of parts, as hereinafter set forth, pointed out in my claims, and illustrated in the accompanying drawings, in which—

Figure 1 is a perspective of the complete device. Fig. 2 is an elevation of the device, one of the sliding doors being removed therefrom. Fig. 3 is a vertical section of the device on the indicated line 3 3 of Fig. 4. Fig. 4 is a horizontal section centrally of the device. Figs. 3 and 4 are turned end for end relative to Figs. 1 and 2. Fig. 5 is a perspective view of the end portion of one of the curtains adapted to be fixed to the side walls of the case.

In the construction of the device as shown I first form a box or casing composed of side pieces 10 11 and end pieces 12 13, connected to form a rectangular frame, the side pieces 10 11 being grooved longitudinally on their inner faces to receive a door 14, slidingly mounted therein and provided with a handle or lug 15 at one end, by means of which said door may be removed and replaced manually. Within the box thus formed are mounted two sections of egg-case filler 16 17, one of the edges of each of the sections being in contact with the door 14 or in close proximity thereto, as shown in Fig. 4. Side bars 18 19 and end bars 20 21 are provided and rigidly connected at their ends to form a rectangular frame of the same length and width as, but of less thickness than, the frame formed by the side pieces 10 11 and end pieces 12 13 and fixed to the main frame by means of rails or in any suitable way, so that the parts of the curtains that are fastened to the edge of the wood of the minor or lower part of the case are clamped between the overlying edges of the minor and main part of the frame or case.

A plurality of curtains are preferably made of canvas. Each curtain is composed of a doubled partition 22$^b$, adapted for placing stiffening material between the overlying parts, and has extensions 22$^a$ at its two corners, adapted to lie across the edges of the frame and to be fastened thereto by means of staples 23 24 on the edges of the mating parallel sides 18 and 19 of the frame, as shown in Fig. 3, or in any suitable way.

22$^c$ represents pieces of paper-board or similar light material placed between the overlying parts of the doubled portion 22$^b$, and 22 represents single extensions at the bottom edges of the doubled portions. The single portions 22 of the curtains overlap the doubled portions thereof, and when the frame to which said curtains are attached is secured by nailing or other means of fastening to the side pieces 10 11 of the other part of the case said curtains extend across and completely inclose the openings of the filler-sections 16 17 opposite to the door 14. The side bars 18 19 are grooved in their inner faces to receive a door 25, slidingly mounted therein and provided with a cleat or lug 26, whereby said door may be removed and replaced manually. A handle or bail 27 is mounted on and secured to the central portion of the side piece 10.

In practical use the door 25 is mounted as shown in Figs. 1 and 4, and in being so mounted said door positions the curtains 22, as shown, in overlapping relations with each other. The filler-sections 16 17 are then inserted and allowed to rest upon the curtains, and the spaces of the filler-sections are filled with eggs, as shown by dotted lines in Figs. 1, 3, and 4, and the case stood upon the side piece 11 and side bar 19 or elevated and transported by means of the handle or bail 27. While being transported in the case the eggs are cushioned by contact with the curtains and filler-sections, and it would be better, if the cases are to be shipped in cars or wagons, to place said cases recumbent on the side bars 18 19 and end piece 21, as in this position the eggs would contact but slightly, if at all, with the sliding door 14.

By removing the door 14 the eggs may be counted readily and without handling them, thus providing against breakage occasioned by frequent handling and economizing of time and labor on the part of those whose business it is to traffic in eggs.

When it is desired to remove the eggs from the case, said case should be positioned with the door 25 approximately horizontal and in close proximity to the surface on which it is desired to deposit the eggs. The door 25 may then be withdrawn gradually or without undue haste and carelessness and the box or case lifted slightly. The eggs will then fall by gravity from the spaces of the filler-sections and roll upon the curtains and from said curtains upon the surface where it is desired that they shall be deposited. During the operation of depositing the eggs from the filler-sections the curtains serve as flexible and cushioning partitions to support the rows of eggs and permit them safely to assume their new positions outside the case. The door 25 may then be repositioned, as illustrated and hereinbefore described, and the case removed and refilled.

The filler-sections illustrated preferably are of the ordinary form well known in commerce and may be collapsed or folded to occupy less space within the case if it be desired to employ the case upon its return trip for the carriage of other articles.

If desired, a rod may be mounted in the end bars 20 21 and traverse the outer faces of the curtains, and when so provided said rod will retain the curtains against opening for the deposit of the eggs until such time as it may be manually removed.

The stiffening-strips of strawboard or similar material 22$^c$ serve as bottoms for the filler-sections when the case is positioned for the removal of the door 25 and depositing of the eggs from the case.

I claim as my invention—

1. In an egg-case, a plurality of flexible curtains fixed at their ends to the side walls of the case to allow their free end portions to descend when the bottom of the case is removed and the case lifted in the manner set forth, for the purposes stated.

2. In an egg-case, a plurality of flexible curtains fixed at their ends to the side walls of a case to allow their free end portions to descend when the bottom of the case is removed and corresponding rows of filler-cells placed on top of the flexible curtains in the manner set forth for the purposes stated.

3. In an egg-case, a cushion consisting of a curtain that is composed of flexible material and doubled at its upper portion and provided with stiffening material and lateral extensions at its top end corners fixed to the side walls of the case, to operate in the manner set forth for the purposes stated.

4. In an egg-case having a removable bottom a plurality of cushions composed of flexible curtains fixed to the side walls of the case at their upper end corners and their lower free end portions adapted to overlie each other and the removable bottom in the manner set forth for the purposes stated.

5. In an egg-case, the combination of two mating frames and a plurality of flexible cushions having projections at their ends fixed between the overlying frames in the manner set forth for the purposes stated.

6. A portable egg-case comprising a four-sided frame, a bottom slidably connected with the frame, a removable top cover, a plurality of flexible cushions in the form of curtains fixed at their ends to the lower portions of the parallel sides of the frame and fillers placed on top of the flexible curtains, arranged and combined to operate in the manner set forth for the purposes stated.

JOSEPH H. LYDAY.

Witnesses:
L. S. LYDAY,
A. H. BERGMAN.